I. A. WEAVER.
PLOW.
APPLICATION FILED APR. 2, 1910.
1,021,024. Patented Mar. 26, 1912.
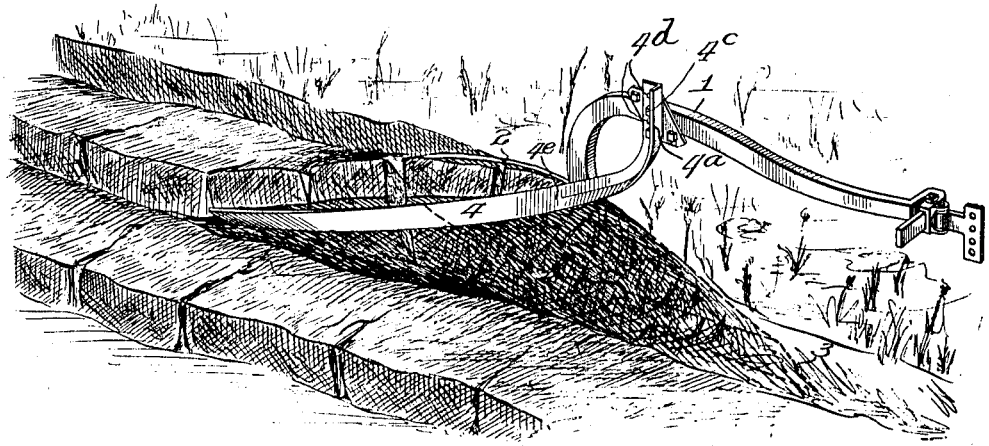
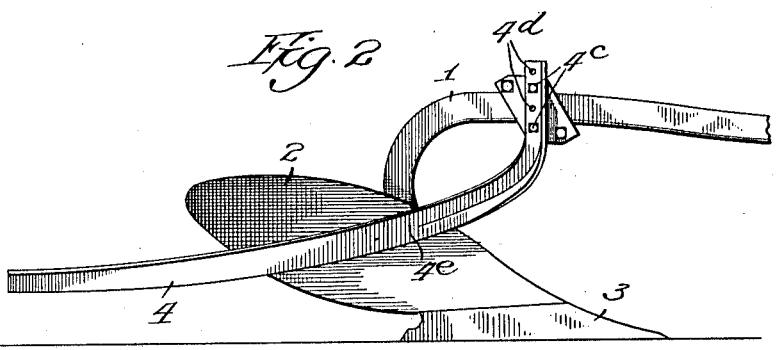
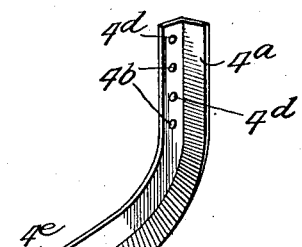

UNITED STATES PATENT OFFICE.

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

PLOW.

1,021,024.  Specification of Letters Patent.  Patented Mar. 26, 1912.

Application filed April 2, 1910. Serial No. 553,033.

*To all whom it may concern:*

Be it known that I, IRA A. WEAVER, of Springfield, county of Sangamon, State of Illinois, have invented new and useful Improvements in Plows, of which the following is a specification.

My invention relates to plows of the common type and has particular reference to an attachment to the beam or frame of a plow, whereby the furrow slice which is turned may be evenly and smoothly laid.

My invention will be more readily understood by reference to the accompanying drawings, wherein, Figure 1 is a perspective view of a plow in service, showing the application of my attachment thereto, some of the parts of the plow being omitted. Fig. 2 is a side elevation of the plow and attachment, and, Fig. 3 is a perspective view of the attachment.

My device is particularly applicable to plows used in working sodded ground. It is well known that in turning sod, the edge of the sod that is cut must travel to a height equal to the width being cut and to one side a distance equal to twice the width of the furrow, while the other edge is only rolled over. This causes the sod to stretch and break, and the end of the moldboard will pitch the broken portion to one side, while the advancing portion will rise higher than normal and fall in advance of the broken rear part, leaving the ground uneven and forming elbows. To obviate this I have devised means whereby the edge of the furrow slice is supported as it is being turned, in order that it may be deposited evenly against the preceding furrow slice.

Referring now more particularly to the drawings, 1 is the plow beam; 2 the mold board, and 3 the plow point of a plow of common form. To the plow beam near its middle, I attach a downwardly and rearwardly extending furrow-slice-supporting arm 4, of peculiar shape. The upper end $4^a$, is in the form of an angle having a plurality of holes $4^b$ and bolts $4^c$, by means of which the device is attached to the plow. Additional holes $4^d$ are provided as a means of adjustment in a vertical direction. This angular portion $4^a$ extends downward for a short distance, the legs of the angle gradually flaring until, at $4^e$, it becomes a plate, standing in practically a vertical position. The remainder of the rearwardly extending portion is also of plate form, but is given a helical twist in order that the furrow may be supported thereby and released therefrom in conformity with the shape given to it by the mold board of the plow.

As will be seen by reference to Fig. 1, as the plow is hauled through the turfed ground, the rising furrow slice will first contact the vertical plate portion $4^e$ of the attachment; as the plow proceeds, the furrow will slide along the plate portion gradually assuming a horizontal position in conformity with the shape of the attachment and will finally be deposited off the rear end of the said attachment in a substantially horizontal position, at a point close to the surface, and, therefore, without opportunity for one part of the sod to fall in advance of the other parts, thereby causing unevenness.

As shown in Fig. 1, I prefer to adjust the attachment at such an angle that its rear end may rest upon the inner edge of the previously turned furrow slice this providing a support for the otherwise unsupported end. For this reason the device may be made of much lighter material than if it were necessary to so construct the attachment that the weight of the sod could be supported by the stiffness of the attachment alone.

It will be understood that my invention may be applied to either hand or wheel, single or gang plows and that the device is capable of modifications in form without departing from the spirit of my invention.

I claim:

1. In a plow, the combination with a plow beam and furrow turning parts, of a furrow slice supporting device having an attaching portion of angle formation adapted to be attached to said beam, said device gradually converging from said angular attaching portion into a flat plate having a helical twist corresponding to the shape of the plow mold board whereby the furrow slice is supported on said device and evenly delivered thereby.

2. In a plow, the combination with a plow beam and furrow turning means, of a furrow slice supporting device comprising a metal angle member flattened throughout a portion of its length to form a supporting plate, said flattened portion being twisted to conform to the shape of the furrow slice being turned, the angle end of said device being upturned and provided with perforations whereby said device is secured to the plow beam and projects therefrom in substantial parallelism with the mold board of the plow.

3. In a plow, the combination with a plow beam and furrow turning parts, of a furrow slice supporting device having an attaching portion adapted to be attached to said beam, said device being formed beyond the said attaching portion into a flat plate having a helical twist corresponding to the shape of a plow mold board whereby the furrow slice is supported on said device and evenly delivered therbey.

4. A furrow slice supporting device comprising a member formed at one end for attachment to the beam of a plow and being flattened throughout a portion of its length to form a supporting plate, said flattened portion being twisted to conform to the shape of the furrow slice being turned, said device being adapted when secured to a plow beam to project therefrom substantially parallel with the mold board of the plow.

IRA A. WEAVER.

Witnesses:
T. P. LUBY,
C. F. CLAPP.

Copies of this patent may be obtained for five cents each, by addressing the "Commissioner of Patents, Washington, D. C."